May 29, 1951  A. A. SCHULTZ, JR  2,554,927
FISHING DEVICE
Filed May 14, 1946  2 Sheets-Sheet 2
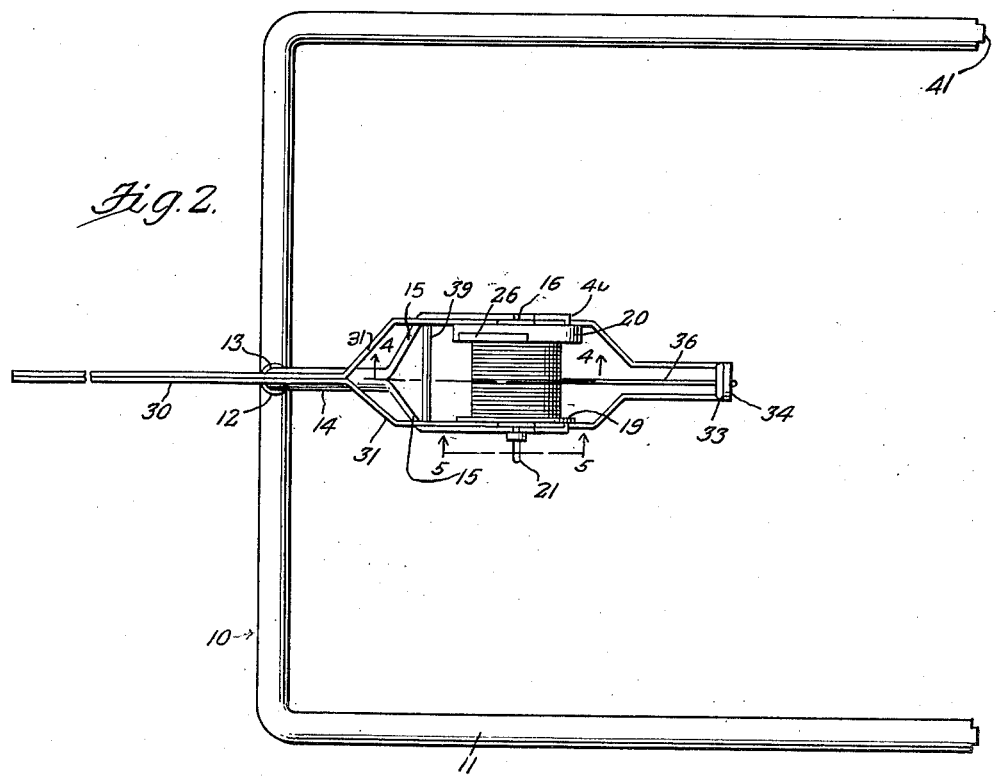
*Fig. 2.*
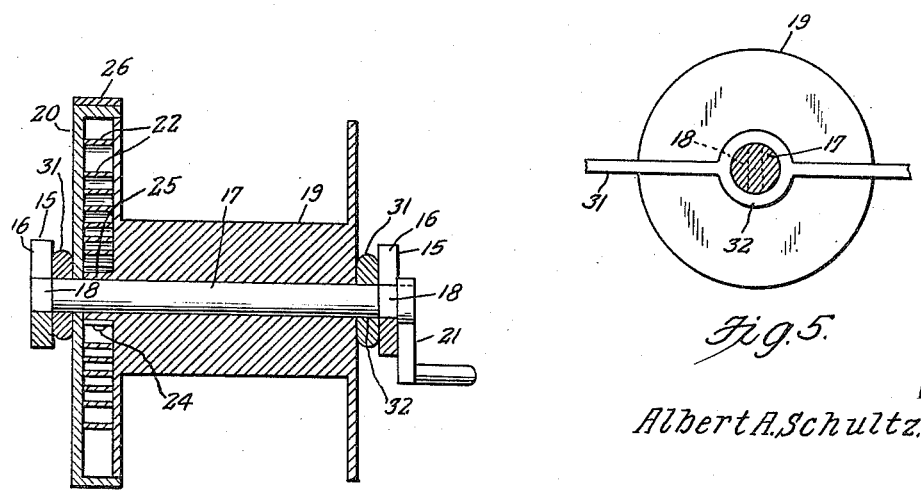
*Fig. 3.*  *Fig. 5.*
Inventor
Albert A. Schultz, Jr.
By Clarence A. O'Brien
and Harvey B. Jacobson
Attorneys Patented May 29, 1951

2,554,927

UNITED STATES PATENT OFFICE 2,554,927

FISHING DEVICE

Albert A. Schultz, Jr., Rogers City, Mich.

Application May 14, 1946, Serial No. 669,705

1 Claim. (Cl. 43—16)

This invention relates to new and useful improvements and structural refinements in fishing devices, more specifically, to a device of the character herein described, which is commonly referred to as "tip-up" fishing tackle.

The principal object of the invention is to provide a fishing device which is entirely automatic in operation insofar as the actual hooking of the fish, and to a certain extent, the reeling thereof is concerned, it only being necessary for the fisherman to set the tackle and subsequently, haul in and remove the fish, after the same has been caught.

A further object of the invention is to provide a device which, by virtue of its construction and operation above outlined, is particularly adapted for fishing through the ice.

Another object of the invention is to provide a fishing device, in which signal means is incorporated for automatically indicating the biting and catching of the fish. It will be apparent that this means is almost indispensable when a plurality of fishing devices are employed simultaneously by the same fisherman.

A still further object of the invention is to provide a fishing device which is simple in construction and operation, and which cannot easily become damaged.

With the above more important objects in view, and such other objects as may become apparent as this specification proceeds, the invention consists essentially of the arrangement and construction of parts as illustrated in the accompanying drawings, in which—

Figure 2 is a top plan view thereof.

Figure 3 is a cross-sectional view, taken in the plane of the line 3—3 in Figure 1.

Figure 4 is a cross-sectional view, taken in the plane of the line 4—4 in Figure 2.

Figure 5 is a cross-sectional view, taken in the plane of the line 5—5 in Figure 2.

Figure 6 is an end view taken in the direction of the arrow 6 in Figure 1 and illustrating the detail of a pointed extremity used in the invention, Figure 7 is a fragmentary perspective detail, showing the mounting of the reel shaft, and Figure 8 is a fragmentary perspective view of a recessed flange of the reel.

Like characters of reference are used to designate like parts in the specification and throughout the several views.

Figure 1:
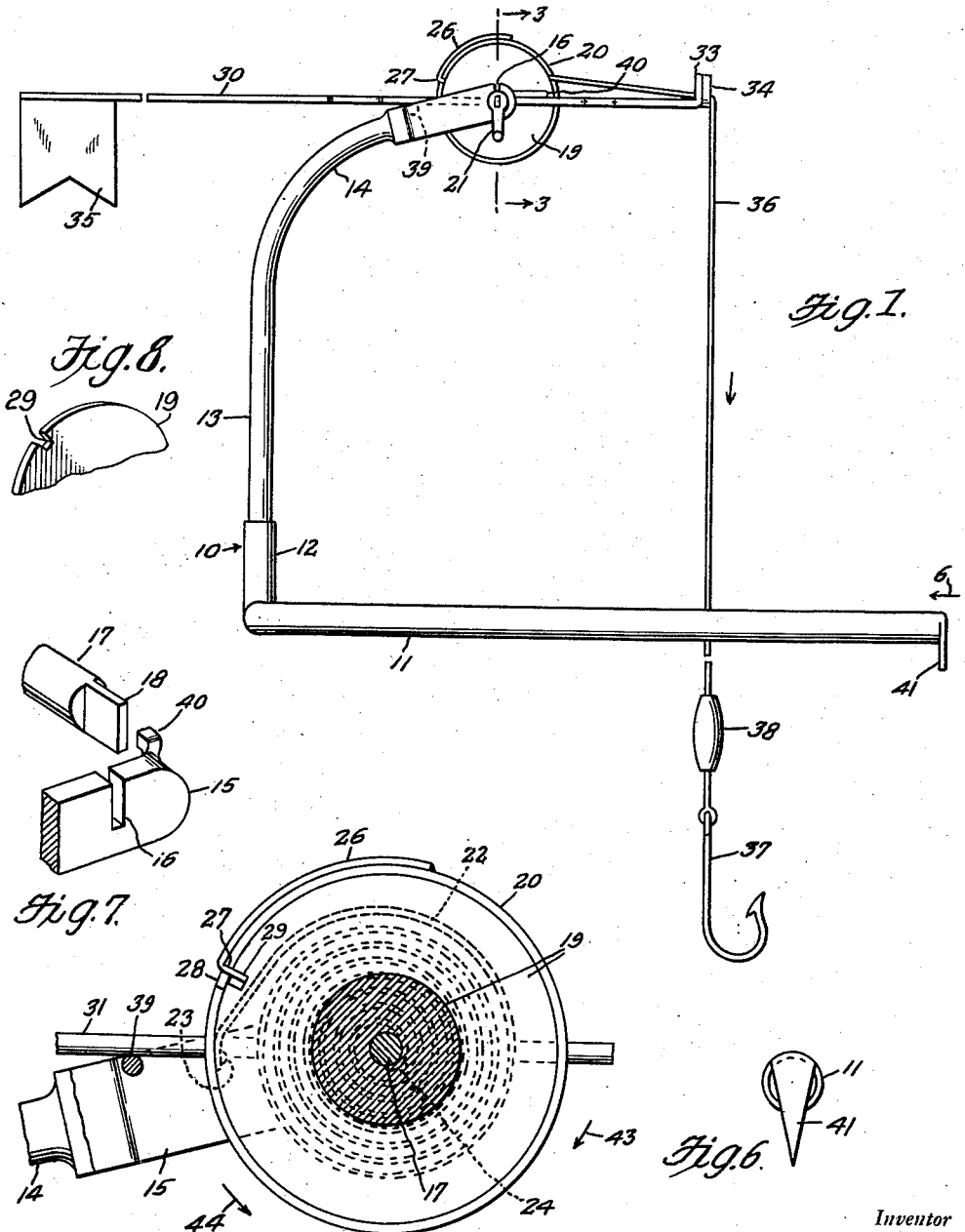
Figure 1 is a side elevation of the invention.

Referring now to the accompanying drawings in detail, the invention consists of a support designated generally by the reference character 10 and comprising a U-shaped base 11, such as may be conveniently formed from a length of tubing. A socket 12 is provided on the mid-portion of the base 11 and an upright standard 13 is removably positioned in the socket, for a purpose hereinafter to be more particularly described.

The free end, that is the upper end of the standard 13 is angulated as at 14 and extends over the base 11. The angulated portion of the standard is in turn, bifurcated and forms a fork 15.

The upper edges of the arms of this fork are notched to provide a pair of aligned seats 16, and a shaft 17, provided with the flat end portions 18, is removably and non-rotatably positioned in said seats, as is best shown in Figures 3 and 7.

A reel 19 is freely rotatable on the shaft 17, one flange of this reel forming a side of a stationary housing 20. The latter is configurated substantially as shown and is secured to the shaft 17. It will be also noted that a suitable crank 21 is secured to one of the flat end portions 18 of the shaft 17.

As is best shown in Figure 3, the shaft 17 extends through the housing 20 and a spiral spring 22 is positioned in the housing, being secured thereto at its outer end as at 23. The inner end of the spring 22 is secured as at 24 to a boss 25, formed integrally with the adjacent flange of the reel 19.

A spring strip 26 is welded or otherwise similarly secured at one end thereof to the marginal flange of the housing 20, while its remaining end is angulated to form a dog 27. This dog extends through a suitable slot 28 formed in the flange of the housing and is engageable with a recess 29 provided in the adjacent flange of the reel 19. However, the spring 26 is so tensioned as to normally urge the dog 27 out of the recess 29.

A signal arm 30 is provided intermediate the ends thereof with a yoke 31, this in turn, being suitably enlarged to accommodate a pair of transversely aligned apertures 32. It will be noted that the yoke 31 straddles the reel 19 together with the housing 20, the extremities of the round portion of the shaft 17 being freely rotatable in the apertures 32. The ends of the yoke 31 which form one end of the arm 30 are upturned as at 33 and an eye 34 is secured to this upturned portion, while the remaining end of the arm 30 carries a suitable flag 35.

A fishing line 36 is secured at one end thereof to the reel 19, whereupon the line passes through the eye 34 and carries at its free end the hook 37 and a sinker 38.

The arms of the aforementioned fork 15 are provided with a transversely extending crossbar 39 and with a pair of upwardly and inwardly angulated lugs 40. It will be noted that the bar 39 and the lugs 40 normally engage the signal arm 30 on the underside and the upper side thereof respectively, thereby normally maintaining the arm 30 in a substantially horizontal position.

It will be also noted that the extremities of the arms of the base 11 are provided with downwardly extending pointed prongs 41, the purpose of which will be presently set forth.

When the invention is placed in use, the base 11 is placed around a suitable aperture formed in the ice, with the prongs 41 engaging the ice surface, to prevent undesirable movement of the base.

The standard 13 is then inserted into the socket 12, whereupon the reel assembly consisting of the shaft 17, the reel 19, the housing 20, and the signal arm 30, is placed in position in the fork 15, with the shaft portions 18 engaging the slots 16.

The line 36 is then pulled outwardly in the direction of the arrow 42, thus rotating the reel 19 in the direction of the arrow 43, and winding the spring 22. It should be understood that during this operation, the normal tension of the strip 26 retains the dog 27 out of engagement with the recess 29, thus permitting the reel 19 to freely rotate. When a sufficient length of the line 36 has been payed out and adequate tension has been placed upon the spring 22, the dog 27 is engaged with the recess 29 by simply pressing the strip 26 toward the housing 20 past slot 28 and into engagement with the wall of the recess 29. The tendency of the reel 19 to rotate under tension of the spring 22 will create sufficient friction to retain the dog 27 in the recess 29, notwithstanding the tension of the spring 26, and rotation of the reel 19 will be prevented.

The device is now in readiness for fishing, and it will be noted that by virtue of the pivoted action of the yoke 31 upon the shaft 17, the signal arm 30 will swing upwardly and downwardly as soon as a fish bites on the hook 37. In this manner, the flag 35 will function as an effective indicator.

Simultaneously, with this biting action, the reel 19 will tend to rotate as shown at 43 against the resiliency of the spring 22, thus disengaging the dog 27 from frictional contact with the wall of the recess 29. The resiliency of the spring 22 will then cause the reel 19 to rotate in the direction of the arrow 44, thereby tending to haul in the line 36. In this manner, the device will be automatically actuated to perform the "hooking" operation, in other words, the spring 22 through the medium of the line 36 will urge the hook 37 to penetrate the lip of the fish, thereby catching the same. At the same time, the resiliency of the spring 22 will permit the fish to wind or unwind the line, whereupon the fisherman may readily bring the fish out of the water by simply removing the standard 13 together with the associated reel assembly from the socket 12.

When the fishing operation has been completed, the line 36 may be wound upon the reel 19 by simply removing the reel assembly including the end portions 18 of the shaft 17 and the yoke 30 from the seats 16, and winding the crank 21. This action will rotate the reel 19, the housing 20 and the shaft 17 as a unit in the yoke 31, thus winding the line 36 on the reel.

It is believed that the use and the advantages of the invention will be clearly understood from the foregoing disclosure, and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A fishing device comprising in combination, a U-shaped base, a socket on the mid-portion of said base, an upright standard removably received in said socket, the free end of said standard being angulated to extend over said base, a fork at the angulated extremity of said standard, a shaft removably and nonrotatably mounted in the sides of said fork, a housing secured adjacent one end of said shaft, a reel rotatably mounted on said shaft, one flange of said reel constituting a side of said housing, a crank handle also secured to said shaft, said flange having a recess formed therein, a spring strip secured to said housing, a dog on said strip, said dog being adapted to engage said recess, a signal arm provided with a yoke intermediate the ends thereof, an eye at one end and a flag at the remaining end of said arm, said yoke being pivotally mounted on said shaft, a spiral spring in said housing, one end of said spring being secured to said housing and the remaining end thereof being secured to said reel, a line windable on said reel, said line passing through said eye, and a hook at the free end of said line, said parts being so arranged that the paying-out of said line winds said spring, and the actuation of said line releases said dog from said recess and operates said signal arm.

ALBERT A. SCHULTZ, Jr.

REFERENCES CITED

The following references are of record in the file of this patent:

UNITED STATES PATENTS

| Number | Name | Date |
| --- | --- | --- |
| 962,309 | Butler | June 21, 1910 |
| 1,154,904 | Bain | Sept. 28, 1915 |
| 2,136,864 | Parquette | Nov. 15, 1938 |
| 2,194,088 | Joabson | Mar. 19, 1940 |
| 2,303,668 | Tilbury | Aug. 21, 1941 |